United States Patent [19]
Engel et al.
[11] 4,115,312
[45] Sep. 19, 1978

[54] X-RAY FLUORESCENT LUMINESCENT CADMIUM TUNGSTATE COMPOSITIONS

[75] Inventors: Gerhard Engel; Manfred Eckle, both of Darmstadt, Fed. Rep. of Germany

[73] Assignee: Merck Patent Gesellschaft mit beschrankter Haftung, Darmstadt, Fed. Rep. of Germany

[21] Appl. No.: 794,204

[22] Filed: May 5, 1977

[30] Foreign Application Priority Data

May 15, 1976 [DE] Fed. Rep. of Germany ....... 2621696

[51] Int. Cl.$^2$ ....................... C09K 11/38; C09K 11/10

[52] U.S. Cl. .......................... 252/301.5; 252/301.6 R; 106/301; 423/58; 423/593; 427/157

[58] Field of Search .................. 423/58, 593; 106/301; 252/301.5; 250/483; 428/913, 539; 427/160, 157

[56] References Cited

U.S. PATENT DOCUMENTS

| | | | |
|---|---|---|---|
| 2,361,467 | 10/1944 | Fernberger | 252/301.5 |
| 2,962,349 | 11/1960 | Anglin | 423/58 |
| 3,023,313 | 2/1962 | de la Mater et al. | 252/301.5 X |
| 3,494,779 | 2/1970 | Pappalardo et al. | 252/301.5 X |
| 3,839,069 | 10/1974 | Linturn | 250/483 X |

*Primary Examiner*—James R. Hoffman
*Attorney, Agent, or Firm*—Millen & White

[57] ABSTRACT

In a process for producing x-ray fluorescent luminescent cadmium tungstate material by precipitation of cadmium tungstate from an aqueous solution of an alkali metal tungstate by the addition of an aqueous solution of a cadmium salt and separation, washing, drying and calcining of the resulting precipitate, an improvement is provided wherein (a) each of the alkali metal tungstate and cadmium salt solutions is at least 1N,
(b) mixing of the two solutions is done over 0.1 to 4 hours,
(c) approximately equivalent amounts of both solutions are mixed,
(d) mixing is done at a temperature of 0° C - the boiling point of the mixture,
(e) the precipitate is activated by calcination at a temperature between 400° and 1200° C for up to 6 hours, and
(f) the thus-activated precipitate is reslurried in water, washed and dried.

8 Claims, 2 Drawing Figures

X-RAY FLUORESCENT LUMINESCENT CADMIUM TUNGSTATE COMPOSITIONS

BACKGROUND OF THE INVENTION

This invention relates to x-ray intensifying screens and to a process for the production of pigments useful therein. These screens, which contain a luminescent material which fluoresces on exposure to x-rays, are used in conjunction with a film sensitive in the selected fluorescence range, especially for medical x-ray investigations.

A large number of luminescent materials have been used for this purpose, but calcium tungstate is used primarily. Since x-rays in excessive dosage can negatively affect the health of the persons investigated, there is, in the medical field a continuing need for intensifying screens with higher degrees of intensification to permit use of minimal x-ray dosages during x-ray investigations.

New luminescent substances developed for x-ray intensifying screens, e.g., gadolinium and yttrium oxide sulfides activated with other rare earths or lanthanum oxide halides activated by rare earths, are very expensive.

A further requirement of medical x-rays is that x-ray intensifying screens have minimal afterglow in order to prevent a weak image of the previous picture being transmitted to the following picture during a very rapid picture sequence (cinematography).

All known luminescent materials for x-ray intensifying screens frequently exhibit an afterglow parallel with intensification. Thus, there is a need for x-ray fluorescent luminescent materials for x-ray intensifying screens which (1) have a very high intensification factor, (2) exhibit minimum afterglow, (3) are simple to produce and (4) are so stable that reproducible x-ray pictures can be made even after a comparatively long period of repeated exposure to x-rays.

It is known that cadmium tungstate is excited to fluoresce by x-rays. In *Chemische Berichte,* Vol. 62, page 763 (1929), is reported strong x-ray excitability. However, the yellow-green light emitted was not considered suitable for intensification purposes. Consequently, although cadmium tungstate has been used in fluoroscopic screens for direct visual observation, it has long since been replaced by zinc sulfide, cadmium sulfide and zinc silicate and never found acceptance in the production of x-ray intensifying screens.

The requirements of a luminescent material for x-ray screens are completely different from those for a luminescent material for x-ray intensifying screens. In both cases, a good fluoroescent yield is required but the afterglow has an insignificant effect in the case of x-ray screens. Consequently, luminescent materials used for x-ray screens, such as zinc sulfide, cadmium sulfide and zinc silicate, are completely unsatisfactory for use in x-ray intensifying screens.

Consequently and surprisingly, in view of the prejudice in the literature against cadmium tungstate as luminescent material for intensifying screens, it was not foreseeable that the use of cadmium tungstate, according to the invention, in x-ray intensifying screens provides much better results than luminescent materials previously employed.

Therefore, an object of the invention is the production of intensifying screens which contain cadmium tungstate as x-ray fluorescent luminescent material and to the screens thus-produced.

SUMMARY OF THE INVENTION

Figure 1:
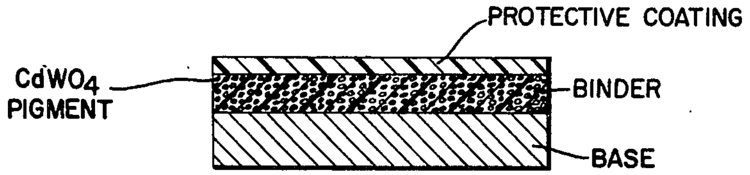
FIG. 1 represents an x-ray screen in accordance with the invention.
Figure 2:
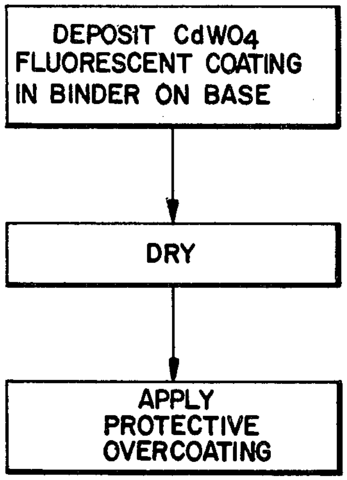
FIG. 2 represents a process for making a screen in accordance with FIG. 1.

This invention relates, in an x-ray intensifying screen comprising a substrate coated with an x-ray fluorescent luminescent pigment, to the improvement wherein the pigment is cadmium tungstate.

X-ray intensifying screens of the invention preferably contain cadmium tungstate with the following properties:

(a) average particle size 3.5 to 20 μm;

(b) at least 80% of the particles are of a particle size range having a maximum deviation of ±5 μm from the average particle size.

In another aspect, this invention relates to compositions useful for the production of x-ray intensifying screens.

In a preparative aspect, this invention relates, in a process for the production of an x-ray fluorescent luminescent cadmium tungstate material by precipitation of cadmium tungstate from an aqueous solution of an alkali metal tungstate by addition thereto of an aqueous solution of a cadmium salt and separating, washing, drying and calcining the resulting precipitate, to the improvement wherein (a) each of the alkali metal tungstate and the cadmium salt solutions is at least 1N;

(b) mixing of the two solutions is done over 0.1 to 4 hours;

(c) approximately equivalent amounts of both solutions are mixed;

(d) mixing takes place at a temperature between 0° C. and the boiling point of the mixture;

(e) the precipitate is activated by calcination at a temperature between 400 and 1200° C.;

(f) the thus-activated precipitate is reslurried in water, washed and dried.

DETAILED DESCRIPTION

Production of cadmium tungstate employed for the x-ray intensifying screens preferably is done so that a solution of cadmium ions is mixed with a solution of tungstate ions, whereby slightly soluble cadmium tungstate precipitates out. The variables of precipitation processes are known. Variation of concentrations of starting materials, of the mixing process, precipitation time, precipitation temperature, pH value, after-treatment as at a particular temperature or by change of pH or choice of starting materials are known to influence the form and size of precipitated particles.

The formation of cadmium tungstate can be represented by the equation:

$$CdX_2 + M_2WO_4 \rightarrow CdWO_4 \downarrow + 2M^+ + 2X^-$$

wherein X is an anion of a soluble cadmium salt and M the cation of a soluble tungstate.

Soluble tungstates include alkali metal tungstates, preferably sodium tungstate. Soluble cadmium salts include halides, sulfate, nitrate, acetate or CdO in combination with acids of the foregoing anions, but cadmium chloride is preferred.

The concentrations of the two reagents should preferably be 1N or higher in order to keep the volume of the precipitation batch within reasonable magnitudes. For optimal utilization of the starting materials, the reactants are mixed in approximately equivalent amounts. It is advantageous that the two solutions being mixed are metered into the reactor so that, at any time, about equivalent amounts of each solution are present in the resulting mixture. However, the cadmium salt solution or the tungstate solution can be prepared and the other solution added thereto. Thus, precipitation can take place in a slightly acidic or slightly alkaline medium. At the end of the reaction, an excess of one component can be present.

Depending on the size of the batch, it can be advantageous to maintain a precipitation time of up to 3-4 hours. In principle, the temperature for the precipitation can be varied between the freezing and boiling point of the mixture but it is preferable to use temperatures between room temperature and about 80° C. The actual precipitation process can then possibly be followed by an after-treatment, e.g., after-stirring at particular temperatures and particular pH. Subsequently, the precipitate is separated off in the usual manner and possibly washed.

The precipitated product must be activated to obtain the properties most preferred for use in x-ray intensifying screens. In the simplest case, the precipitate is activated by drying and tempering the precipitate slurry at temperatures between 400° and 1200° C., from a few minutes up to 5-6 hours. Thereafter, the product is again slurried in water, washed and dried.

However, in most cases, better results are obtained when the precipitate slurry is mixed with an additive, dried and tempered. Additives are so-called "mineralizer" salts, which promote formation of uniformly large and uniformly shaped crystals and which can be washed out again after activation. Exemplary of salts suitable for this purpose are, cadmium salts used for the precipitation and alkali metals salts, preferably sodium and potassium salts having anions as for the cadmium salts, preferably the chloride and sulfate. The additives are added in amounts of 0.01 to 4 mol, preferably 0.1 to 1 mol, per mol of cadmium tungstate in the precipitate slurry, which usually contains about 50 weight % of water. The temperatures employed during activation with additives are, as a rule, lower than for activation without an additive. Preferred temperatures are those which do not exceed 750° C., most preferably 600° to 700° C. The activation time depends on activation temperature and on the desired particle size, since displacement to larger particle sizes occurs after comparatively longer times. The period of activation can vary from a few minutes up to about 6 hours. At very low temperature, longer times can be used. For economic reasons, shorter activation times, about 30 minutes to 1 hour, are preferred. After the activation, the preparation is slurried in water, washed and dried.

A most preferred activation method is one wherein the precipitate slurry, provided with additive and dried, is tempered at relatively low temperatures of 400° to 600° C., slurried in water, washed and dried and again subjected to activation, at higher temperatures of about 700°-1000° C.

Which of these activation processes is chosen depends on the requirements of the user of the end product. The activation process using an additive is somewhat more laborious and makes the total process somewhat more expensive but gives, as a rule, products with especially good properties. However, for certain purposes, products obtained by the simple activation process, which are better than those of the prior art, are also useable.

In a preferred embodiment, the precipitation slurry is mixed with a cadmium salt selected from cadmium halides, sulfate, nitrate and acetate or an alkali metal salt, preferably a sodium or potassium salt of the above anions, in a molar ratio of 0.01 to 4, preferably 0.1 to 1 mol per mol of cadmium tungstate in the precipitation slurry; dried; activated at a temperature between 600° and 700° C. and finally slurried in water, washed and dried.

In a further preferred embodiment of the process, activation first takes place with one of the above additives at a temperature of 400° to 600° C., and the product is thereafter slurried in water, washed and dried and subsequently activated at 600°-1200° C.

Cadmium tungstate has considerable advantages over fluorescent luminescent materials previously conventional in x-ray intensifying screens. Very good intensifying properties are obtained. The intensification factor of an x-ray fluorescing luminescent material is known to increase as the average particle diameter of the luminescent material increases. But, with increasing particle size, the sharpness of the x-ray picture and thus the resolving power decreases. In practice, luminescent materials with a particle size between 3 and 25 μm. have proved to be useful, the smaller particle sizes being preferred because of the sharper picture obtained. However, because of the very strongly decreased fluorescence yield (or intensification factor) with small particles, small particle sizes have hitherto been used only in special cases.

In the Table which follows, intensification factors of cadmium tungstate of various particle sizes are compared with intensification factors of the previously employed calcium tungstate of corresponding particle sizes. As a measure of particle size are given d 50 values, which represent a particle distribution of which 50% of the particles have a smaller diameter than the limiting value given. These values are determined by the WASPS method (wide angle scanning photo-sedimentometer). The intensification factor is compared to a calcium tungstate available commercially for production of intensifying screens, of which intensification factor was arbitrarily fixed as 1. Powder pictures were made in order to exclude the various influences of the other components of the screen. Irradiation took place under usual diagnostic conditions.

| d 50 value WASPS | Intensification Factor | |
|---|---|---|
| μm. | $CdWO_4$ | $CaWO_4$ |
| 4 | 2 | 0.2 |
| 6 | 2.5 | 0.5 |
| 12 | 3 | 1 (standard) |
| 15 | 4 | 1.6 |

From the Table, it is apparent that cadmium tungstate of the invention has a substantially greater intensification factor than calcium tungstate of the same particle size.

By use of cadmium tungstate, it is possible to produce x-ray intensifying screens having luminescent material of very small particle sizes, which thus give x-ray pictures having very sharp images. When somewhat larger particles sizes are used, exposure times can be shortened. This not only reduces irradiation stress on patients but leads also, especially in the case of moving organs, to improvement of the image sharpness.

A further very important advantage of the x-ray intensifying screens of the invention is that practically no measurable afterglow occurs. This property makes the x-ray intensifying screens based on cadmium tungstate according to the invention especially valuable in x-ray diagnosis. X-ray pictures are thereby be taken in practically any desired rapid sequence without a reduction of quality of the individual picture by superimposition thereon of a weak image of the previous picture.

Because of the luminescent material employed, the stability of the x-ray intensifying screens of the invention is limited only by the other components employed in the screen. This is especially important because a large number of x-ray pictures can be produced under practically identical conditions, i.e., irradiation doses do not have to be adjusted after a short period of use because of changes in intensification properties.

The cadmium tungstate employed possesses a continuous emission spectrum resulting from excitation by x-ray radiation from 400 to 700 nm. The intensity maximum lies at about 490 nm. Because of the range of this emission spectrum, the x-ray intensifying screens of the invention can be used with advantage in combination with all customary x-ray films.

The screens of the present invention can be constructed in a manner quite analogous in mechanical details to that used for making calcium tungstate screens. Among the numerous published references are U.S. Pat. Nos. 3,023,313 and 3,839,069, whose disclosures are incorporated herein by reference.

A thin uniform coating of the fluorescent material suspended in a solution of the binder and a suitable solvent, the ratio of binder to $CdWO_4$ (W./W.) being in general from about 1:3 to about 1:20, more preferred from about 1:5 to about 1:15, both materials together being of a concentration in the solvent of from about 50 to about 90% by weight, more preferred of from about 60 to about 80% by weight, is applied to a sheet of supporting material by any convenient means. The coating solution may, for example, be flowed over the surface of the supporting material, or it may be spread over the surface using a doctor blade, or it may be applied by a combination of these methods. Solvent is removed by drying. A protective coating of plastic is then applied over the fluorescent coating, e.g., by applying a solution of the binder or some other polymeric substance and allowing it to dry or, alternatively, by applying a preformed film of a moisture-impermeable plastic such as polyethylene terephthalate or polyvinylidine chloride to the fluorescent coating using a suitable adhesive. The purpose of this protective coating is to seal the fluorescent coating against moisture and air and to protect it against mechanical abrasion. The art of coating sheet materials is well known and requires not further description or explanation here.

The supporting material to which the fluorescent coating is applied may be any one of a number of materials such as cardboard, plastic, glass, or the like. Glass and plastic provide a smooth base for the coating, but are more expensive. Cardboard, particularly laminated cardboard, is economical and flexible, and is the material most commonly employed for this purpose.

The binder used for the fluorescent coating is of some importance. It should not absorb the light emitted by the cadmium tungstate. It should of course be compatible with the tungstate and should be free of residual catalysts or other substances which might decompose the tungstate. It should be flexible and resistant to cracking or checking, as well as durable and abrasion resistant since surface imperfections are a common source of screen failures.

If the same material is to be used both as a binder and as a protective coating for the fluorescent coating, it should be substantially impervious to air and moisture so as to provide a protective shield for the tungstate. It should preferably be substantially soluble in non-polar aromatic or aliphatic solvents. Exemplary polymers which are satisfactory and useful both as binders and as protective materials for the purposes of the present invention are polymethyl methacrylate, and similar polymers of this type such as polyethyl methacrylate, polyisobutyl methacrylate and poly-n-butyl methacrylate; and other vinylic polymers, including polystyrene, polyvinyl acetate and polyvinyl chloride. Either the same or different polymers may be used for the base coating, the fluorescent coating and the overcoating. Also two or more of these polymers, e.g., polymethyl methacrylate and polystyrene, may sometimes be combined advantageously in the same coating.

The fluorescent coating may also contain small amounts of dispersing agents, plasticizers, or other auxiliary substances having no direct effect on the resolving power or the speed of the screen but which improve the uniformity and smoothness of the fluorescent coating.

The fluorescent coating may be of any desired thickness. Increasing the thickness of this coating tends to increase speed and decrease resolution whereas decreasing the thickness tends to increase resolution and decrease speed. The most generally useful thickness is about 6–8 mm., but coatings of 3–4 mm. thickness or less or 10 mm. or more can be employed.

After incorporation of activated cadmium tungstate into x-ray intensifying screens are described, x-ray intensifying screen thus obtained are superior to intensifying screens of the prior art with regard to luminescent yield and afterglow, are very stable, and, furthermore, are easy to produce.

In the following Examples, the preparation of the cadmium tungstate according to the invention is explained in more detail. The products are characterized by luminescent properties and average particle size. Fluorescene was measured following irradiation with x-rays under conditions usual for medical x-rays. The values obtained are compared to a commercially available calcium tungstate with a d 50 WASPS value of 12 $\mu$m., the fluorescence of which was arbitrarily set at 1. As a measure of average particle size are given d 50 WASPS values, in which d 50 means that 50% of the particles possess a smaller diameter than the given limiting value and WASPS (wide angle scanning photosedimentometer) characterizes the measuring apparatus and the measurement method. This method is described in *Silicates Industriels,* Vol. 36, pages 173–185 (1971).

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLE 1

A 15 wt. % solution of cadmium chloride and a 17 wt. % solution of sodium tungstate are mixed together in an equimolar ratio at 20° C. The resultant precipitate is separated off, washed, dried and activated for 30 minutes at 400° to 1000° C., with increasing temperature. It is thereafter slurried in water, filtered off with suction, washed and dried. Cadmium tungstate luminescent material with the following properties is obtained:

fluorescence: 2
phosphorescence: not measurable
d 50 WASPS: 10 μm.
85 wt. % of the particles within the range of 5 to 15 μm.

EXAMPLE 2

10 parts by weight of the washed precipitate of Example 1 are mixed with 1 part of cadmium chloride, dried and activated for 2 hours at 700° C. Thereafter, the product is slurried in water, washed and dried.

Cadmium tungstate luminescent material with the following properties is obtained:

fluorescence: 2
phosphorescence: not measurable
d 50 WASPS: 5 μm.
83 wt. % of the particles within the range of 1 to 10 μm.

EXAMPLE 3

The procedure of Example 2 is followed, except that the period of activation is 4 hours.

Cadmium tungstate luminescent material thus obtained has the following properties:

fluorescence: 3.5
phosphorescence: not measurable
d 50 WASPS: 12 μm.
92.5 wt. % of the particles within the range of 5 to 20 μm.

EXAMPLE 4

A 15 wt. % cadmium sulfate solution and a 17 wt. % sodium tungstate solution are added simultaneously and in equimolar amounts, while stirring at 60° C., slowly to completely desalinated water. The precipitate slurry is washed, dried and activated for 4 hours at 1000° C.

Thus-obtained cadmium tungstate luminescent material has the following properties:

fluorescence: 3
phosphorescence: not measurable
d 50 WASPS: 20 μm.
69 wt. % of the particles within the range of 15 to 25 μm.

EXAMPLE 5

10 parts by weight of the precipitate slurry obtained according to Example 4 are mixed with 1 part of cadmium chloride, dried and activated for 30 minutes at 700° C., and thereafter slurried in water, washed and dried.

Cadmium tungstate luminescent material thus obtained has the following properties:

fluorescence: 1
phosphorescence: not measurable
d 50 WASPS: 3 μm.
82 wt. % of the particles within the range of 2 to 7 μm.

EXAMPLE 6

A fluorescent coating composition for a cadmium tungstate screen was prepared according to the following formula:

Cadmium tungstate: 200 g.
Polymethylmethacrylate: 25 g.
Toluene: 100 ml.
Butyl benzyl phthalate: 10 ml.

The mixture was milled on a ball mill using solid glass spheres until the insoluble components were finely and uniformly dispersed in the liquid medium.

This composition was applied to cardboard by conventional means to give, after drying, a fluorescent coating 6–7 mils thick. The cardboard had previously been given a base coat of cellulose butyrate and then coated with polystyrene dissolved in a mixture of toluene and acetone to promote a firm bond between the supporting material and the fluorescent coating. The supporting material with its base coatings was thoroughly dried before the fluorescent coating was applied. Before the fluorescent coating was completely dry, successive thin coats of polystyrene dissolved in toluene were applied until all the remaining interstices in the fluorescent coating were filled and there was a thin film of polystyrene about 1 mm. thick over the entire surface of the screen. Instead of polystyrene, polymethylmethacrylate can be used for the overcoating.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for producing x-ray fluorescent luminescent cadmium tungstate material by precipitation of cadmium tungstate from an aqueous solution of an alkali metal tungstate by the addition of an aqueous solution of a cadmium salt and separation, washing, drying and calcining of the resulting precipitate, the improvement wherein (a) each of the alkali metal tungstate and cadmium salt solutions is at least 1N,
(b) mixing of the two solutions is done over 0.1 to 4 hours,
(c) approximately equivalent amounts of both solutions are mixed,
(d) mixing is done at a temperature of 0° C the boiling point of the mixture
(e) the precipitate is activated by calcination at a temperature between 400° and 1200° C. for up to 6 hours, and
(f) the thus-activated precipitate is reslurried in water, washed and dried.

2. The process of claim 1, wherein the alkali metal tungstate is sodium tungstate and the cadmium salt is cadmium chloride.

3. The process of claim 1, wherein mixing of the alkali metal tungstate and the cadmium salt is done over 3-4 hours.

4. The process of claim 1, wherein mixing of the alkali metal tungstate and the cadmium salt is done at room temperature to 80° C.

5. The process of claim 1, wherein the precipitate is activated by calcination at 600°-700° C.

6. The process of claim 1, wherein the thus-precipitated slurry of cadmium tungstate is mixed with 0.01 to 4 mol of a mineralizer salt selected from sodium, potassium and cadmium chloride or sulfate per mol of cadmium tungstate in the slurry, dried, calcined at 400°-600° C, reslurried, washed and subsequently activated at 600°-1200° C.

7. The process of claim 1, wherein the alkali metal tungstate is sodium tungstate and the cadmium salt is cadmium chloride, mixing of the $Na_2WO_4$ and $CdCl_2$ is done over 3-4 hours at room temperature to 80° C. and the precipitate is activated by calcination at 600°-700° C.

8. The process of claim 1, wherein the alkali metal tungstate is sodium tungstate and the cadmium salt is cadmium chloride, mixing of the $Na_2WO_4$ and $CdCl_2$ is done over 3-4 hours at room temperature to 80° C., the thus-precipitated slurry of cadmium tungstate is mixed with 0.01 to 4 mol of sodium, potassium or cadmium chloride or sulfate per mol of cadmium tungstate in the slurry, dried, calcined at 400°-600° C., reslurried, washed and subsequently activated at 600°-1200° C.

* * * * *